United States Patent [19]

Kolodziej et al.

[11] Patent Number: 5,040,940

[45] Date of Patent: Aug. 20, 1991

[54] DEVICE FOR THE ALIGNMENT OF THE DESHEATHED ENDS OF ROUND CABLES

[76] Inventors: Helmut Kolodziej, Adalbert-Stifter-Str. 33, D-6457 Maintal 2; Josef Schatterny, Riedstrasse 71, D-6000 Frankfurt am Main 60, both of Fed. Rep. of Germany

[21] Appl. No.: 430,520

[22] Filed: Nov. 1, 1989

[30] Foreign Application Priority Data

Nov. 7, 1988 [DE] Fed. Rep. of Germany ....... 3837710

[51] Int. Cl.[5] .............................................. B25J 13/08

[52] U.S. Cl. .................................... 414/764; 414/771; 414/783; 29/868

[58] Field of Search ............... 414/764, 767, 771, 783; 29/868, 872, 759, 755, 869, 33 M

[56] References Cited

U.S. PATENT DOCUMENTS 3,999,289 12/1976 Buttner et al. .................... 29/753 X
4,030,174 6/1977 Buttner et al. ................ 29/564.2 X
4,196,510 4/1980 Gudmestad et al. .......... 29/33 M X
4,616,933 10/1986 Leveque et al. .
4,858,311 8/1989 Koch ............................... 29/868 X

FOREIGN PATENT DOCUMENTS 0061811 10/1982 European Pat. Off. .
1299893 7/1969 Fed. Rep. of Germany .
2542743 4/1977 Fed. Rep. of Germany .
3112205 10/1982 Fed. Rep. of Germany .
3144281 5/1983 Fed. Rep. of Germany .
3206774 9/1983 Fed. Rep. of Germany .
3440711 5/1985 Fed. Rep. of Germany .
3643201 6/1988 Fed. Rep. of Germany .
3703388 8/1988 Fed. Rep. of Germany .

*Primary Examiner*—Robert J. Spar
*Assistant Examiner*—William M. Hienz
*Attorney, Agent, or Firm*—Bell, Seltzer, Park & Gibson

[57] ABSTRACT

The apparatus described measures the angle of rotation necessary to rotate a cable end from a first angular position, wherein the cores of the cable end have a certain position independent of their color, to a desired angular position, at a measuring station. The cable end is then brought into an aligning station where a rotational movement through the measured angle occurs. Subsequent to core color identification, the cable end is further turned, if required. There is provided for the scaning of the position of the cores a rotatable and axially slidably mounted scanning element which is coupled with an angle of rotation signal generator, which element contacts individual cores by means of scanning fingers or engages in the external intermediate spaces of the cores. During the scanning process the scanning element is disconnected from all drives.

13 Claims, 5 Drawing Sheets

DEVICE FOR THE ALIGNMENT OF THE DESHEATHED ENDS OF ROUND CABLES

Figure 1:
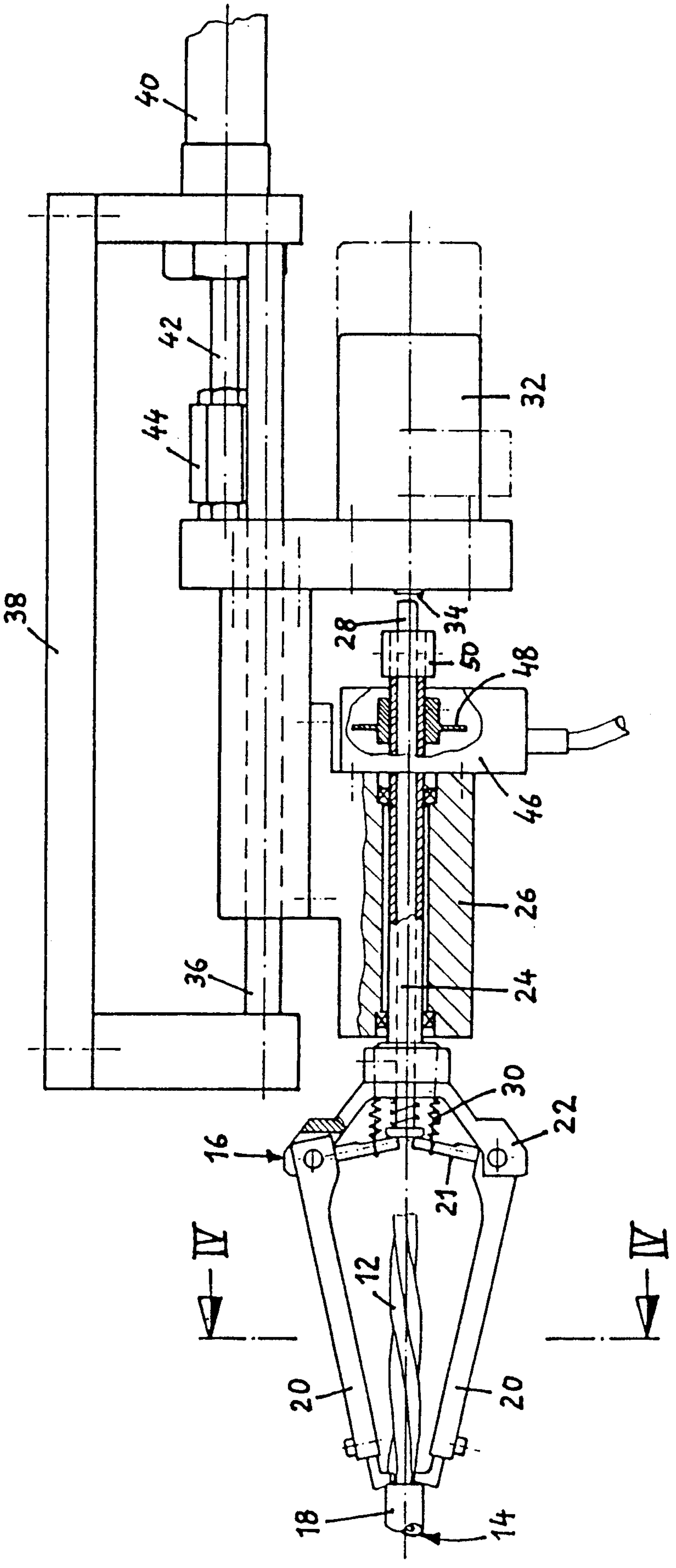

The invention relates to a process in the assembly of cables for the alignment of the desheathed ends of round cables with several cores which are differentiable by the colours of the insulation, whereby the cable end is mechanically scanned and turned to a first angle of rotation position in which the cores take up a certain position independent of their colour, and subsequent to determination of the colour of one or several cores the cable end is turned further by a single increment of its angular pitch or a multiple thereof to a second angle of rotation position, if the predetermined alignment has not yet been achieved by the first angle of rotation position.

The invention relates further to a device for the execution of such a process.

In cable assembly various processes are performed on the various core ends, and various contact elements are attached. Thus, for example, the protective conductor has to be treated differently to the current-conducting cores. It is therefore necessary for the automation of cable assembly to identify the individual cores of a cable on the basis of the different colours of its insulation or other differentiating features, and to place these in a certain position so that subsequently the cores determined by their position are able to be fed to differing types of processing.

In this conjunction it is well-known from EP-A1-00 61 811 that one of the cores of the cable be made identifiable by means of an insert consisting of magnetic powder or steel inside the insulation. When being aligned the cable is first of all turned through 360° whereby the position of the marked cores is determined by means of a sensor which responds to the insert. Then in the same station the cable is once again turned through the same angle as is necessary in order to place the cores in the predetermined, aligned position. The process has the fundamental disadvantage that it is not usable with normal round cable without any special magnetic insert inside a core. Moreover, it does not function when several unmarked cores are to be treated differently and their position is non-defined with respect to the marked core. Ultimately the entire process cannot be performed sufficiently quickly so as to arrive at an equally short cycle period as is the case for the other treatment processes in cable assembly.

Furthermore, registering the colours of the cores during the turning of the cable end by means of several light sources and receptors, and stopping the rotational movement of the cable at a certain angle of rotation position are well-known from DE-PS 2 542 743. In so doing it is disadvantageous that the expensive optical device and the electronics for colour evaluation have to be present at least double. Moreover, the known device functions unreliably and imprecisely, since the optical device, which is influenced by inevitable contamination, colour tolerances and positional errors of the cores, is used not only for colour identification, but also for the positioning of a certain angle of rotation position of the cable. The principal error in the process lies in the fact that the optical device for the identification of colours is unable to determine any exact colour "maximum" point when the cores of varying colours move past a colour sensor.

The uncertainties to be put up with hitherto in the automatic identification of the colours of the relatively thin cores have in addition the consequence that the positioning of the cable end is only able to be performed relatively slowly in circumferential direction. In the case of the known device this then has a particularly serious effect above all on the cycle period, if in compliance with DE-OS 34 40 711 the function is only being carried out by a single colour sensor, so that in the case of three-core and multi-core cables the cable has to be turned several times, and stopped where required, in order to gain certainty as to the position of the cores. However, the cycle period can only be set so that it is longer than the longest find and alignment process.

In DE-OS 31 44 281 is also to be found the proposal that the cores of the cable be placed independently of their colour, by means of mechanical scanning in a certain position, i.e. the cable end in a certain first angle of rotation position. The respective colour of the cores held in the predetermined positions is then registered by means of several colour sensors. If it is ascertained in so doing that the cores of a particular colour are not located respectively in the position envisaged for them, the cable will then be turned further, and the two processes of the mechanical scanning of the predetermined angle of rotation position of the cores then repeated independent of their colour and colour identification. If only one single colour sensor is available, three or more mechanical scanning procedures each with subsequent colour identification are thus necessary, if necessary, depending on the number of cores, and the cycle time must be selected to be accordingly long. It can indeed be shortened by using several colour sensors, however, in this way the design costs and the danger of functional defects are considerably increased.

With the known device the situation is aggravated by the fact that the mechanical scanning device responds to differences in the cross-sectional dimensions of the cable and has to be reset each time a cable with a different cross-section is assembled. Moreover, diameter and positional tolerances can lead to functional defects.

The invention is therefore based on the objective of creating a process and a device of the type mentioned at the beginning, which at comparatively low design cost ensures a considerably quicker and simultaneously reliable alignment of the cable ends.

The aforementioned objective is solved in terms of processing in that initially only the angular distance from the first angle of rotation position is measured by means of mechanical scanning in a measuring station where the cable end is firmly held and then the cable end is brought into an aligning station and to the first angle of rotation position by a movement of translation and a rotational movement through the measured angular distance, and subsequent to colour identification is turned further by a certain angle where required.

The invention offers the advantage that for all alignment processes the transition to a particular position of the cores, initially independent of their colour, has to be achieved once only from an incidental angle of rotation position, whereby the cable does not even have to be stopped with continuous measurement more or less imprecisely in the reference position during turning, because the measurement of the angular deviation from the reference position proposed in compliance with the invention takes place without rotation of the cable and is a self-contained process. Subsequent to this only defined rotational movements of the cable follow, namely from the incidental starting position to the first defined angle of rotation position, and where required from there onwards incrementally further by the angular pitch until the cores of a certain colour are located in certain positions.

The possibility exists that subsequent to the measurement of the angular deviation from the first defined angle of rotation position the cable is turned whilst still in the measuring station by the angular deviation to this defined angle of rotation position. This rotational process can also take place on the conveying path from the measuring station to the alignment station so that only those rotational movements which are necessary in accordance with the colour identification processes still have to be performed there. However, a process is preferred in which the turning of the cable end also takes place from the incidental starting position to the first defined angle of rotation position in the alignment station, because a device for the turning of the cable is needed there anyway.

A particularly short cycle period is achieved according to the invention by splitting up the entire alignment process into two work procedures. However, in so doing the peculiarity exists that the first of these two work procedures, namely the measurement of the angular deviation from a reference position with a fixed cable end, even if regarded alone, is new.

In a preferred embodiment of the process according to the invention instead of the cross-dimensions of the cable the depressions between adjacent cores are scanned. Thus the mechanical scanning process orientates itself only around the irregular contour of the desheathed cable end so that within certain limits it does not play a role which cross-sections the cable and its cores have. Diameter tolerances can also have no harmful effect. Theoretically it would indeed suffice to scan only a single core or the recess between two adjacent cores. However, scanning engagement into all intermediate spaces between the cores offers the greatest possible certainty of a defect-free functional routine.

In order to further enlarge the functional certainty of mechanical scanning, a preferred embodiment of the invention provides that during the scanning an axial relative movement takes place between the cable end and the scanning element. Since the cores are twisted, even a scanning element which is placed on a core randomly right on the outside will make engagement in an intermediate space between the cores during the axial relative movement.

For the purpose of executing the process according to the invention a device is proposed with a scanning element differentiating between the cores of a desheathed cable end and its intermediate spaces, a rotatable retainer for the cable end and at least one colour sensor, wherein the scanning element in a measuring station in contact with the cores of the torsionally firmly held cable end is rotatable about the latter's axis and is coupled with an angle of rotation measuring device, by which device the angular distance of the scanned angle of rotation position of the cable end from a first defined angle of rotation position is measured, in which position the cores have a certain position independent of their colour, and adjacent to the measuring station an aligning station is arranged which is connected to the measuring station by way of a conveying device guiding the cable end, to which aligning station the colour sensor is attached and the cable end is rotatable by means of the rotatable retainer.

It is important for the invention that the scanning element is as easily rotatable as possible, since in particularly preferred versions it derives its rotational movement only from the scanning engagement in the intermediate spaces of the cores. In order to ensure easy rotatability of the scanning element it is provided in a further preferred embodiment of the invention that during the scanning process both a drive necessary for the actuating of the sensors or fingers of the scanning element and a rotational drive required for the turning back of the scanning element to the initial position are disconnectable from the scanning element.

In order to avoid defective functioning in colour identification, the cable end has to be guided very precisely, and it is essential with which alignment of the colour sensor relative to the cores of the cable the colour of a certain core is registered. Very precise guidance and retention of the cable end is achieved in a practical embodiment of the invention in that the conveying device between the measuring station and the alignment station comprises movable clamping tongs by which means the cables near to the free end of the cable sheath are torsionally firmly holdable, and in that a centering guidance element in the alignment station, in which element the cables are rotatable, can be applied to these right next to the free end of the cable sheath, and the rotatable retainer is firmly clampable onto the cable sheath on the opposing side of the clamping tongs. This results in an optimized arrangement of the components which convey, hold, turn and centre the cable at the decisive point.

Should it turn out that errors in colour identification occur when the colour sensor's ray is aligned radially to the cable due to positional and thickness tolerances, contamination etc., in a further practical embodiment of the invention it is proposed that a stationary colour sensor be arranged in such a way that its ray is essentially tangentially directed relative to a circle circumscribing the cores. Alternatively the colour sensor can also be mounted pivotably and be guided in such a way that its ray forms at least once a tangent on the circle circumscribing the cores during a back and forth pivoting movement. The tangential alignment provides the best guarantee that the light ray directed by the colour sensor onto the cores, which ray has necessarily and inevitably a certain width, hits only a single core. If the cores are moved by turning the cable end and/or by the pivoting movement of the colour sensor through the latter's essentially tangentially directed ray, further certainty of the correctness of the colour registered can be gained by passing on the assessed colour signal to the evaluation electronics only during the first and/or last phase, whilst a core is moving into or out of the ray, because in these phase sections the best prerequisites are given for the colour sensor receiving the light reflected by only a single core.

Figure 2:
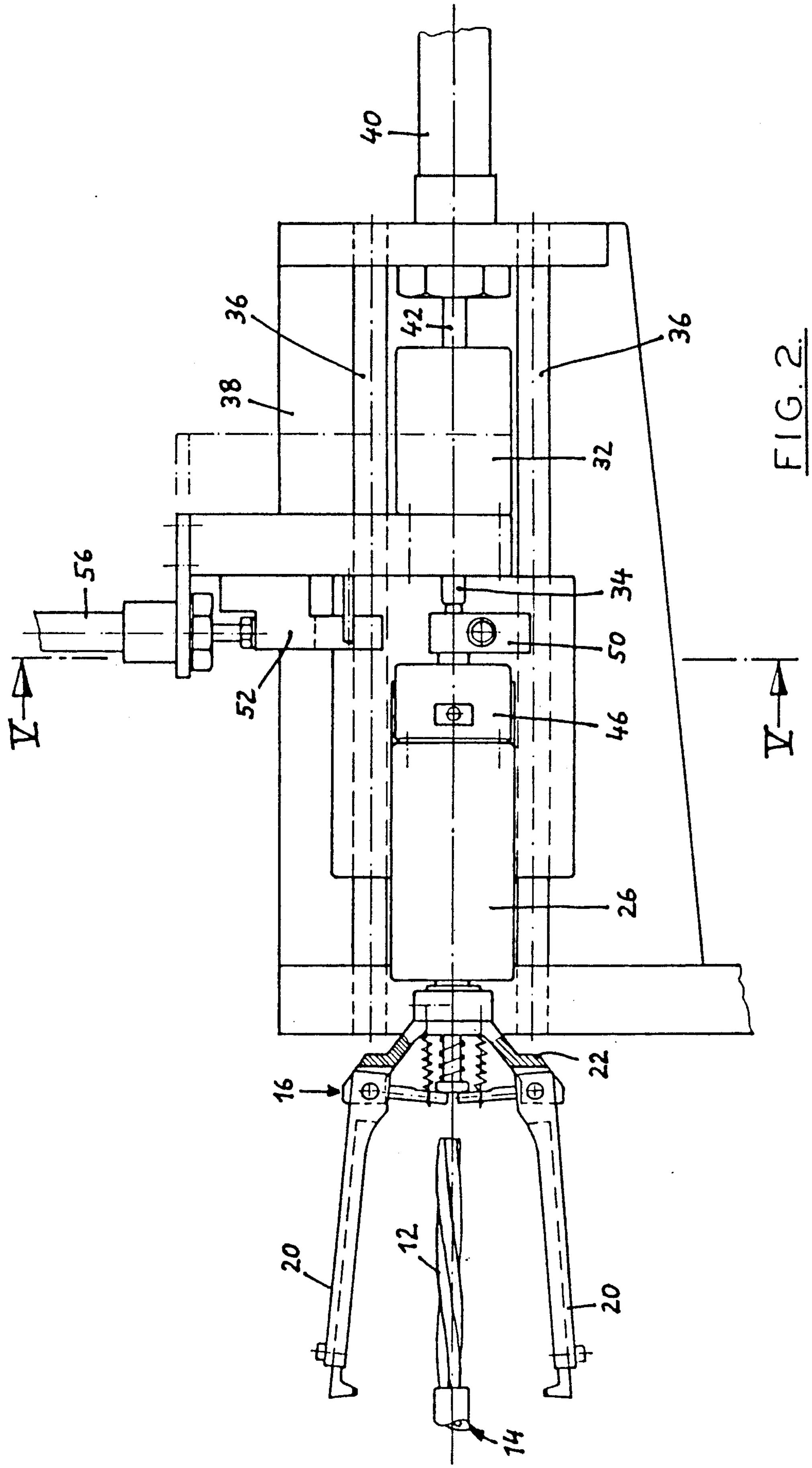
Figure 3:
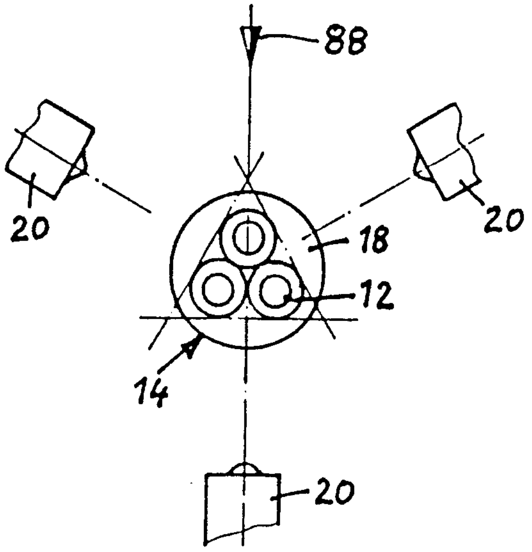
Figure 4:
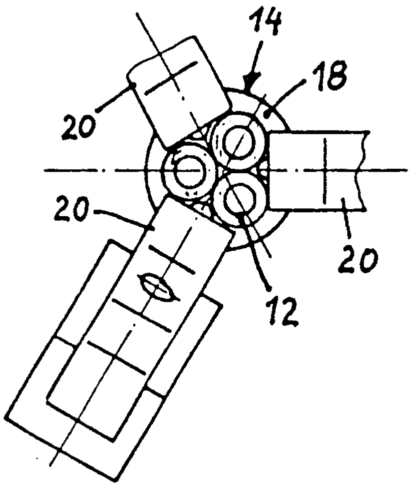
Figure 5:
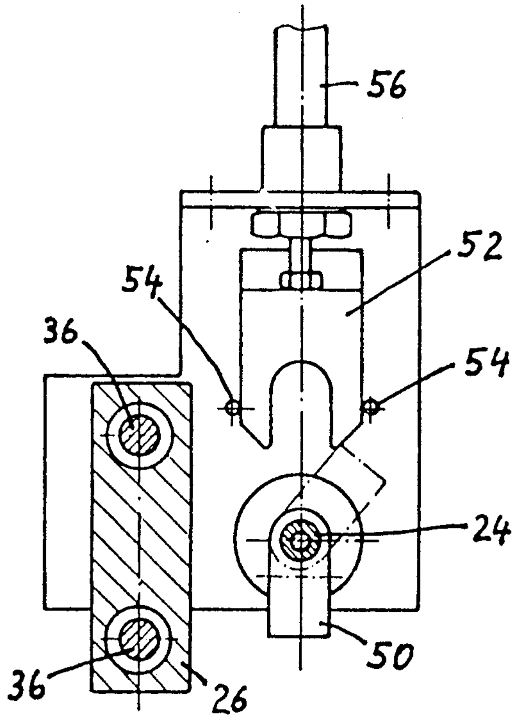
Figure 6:
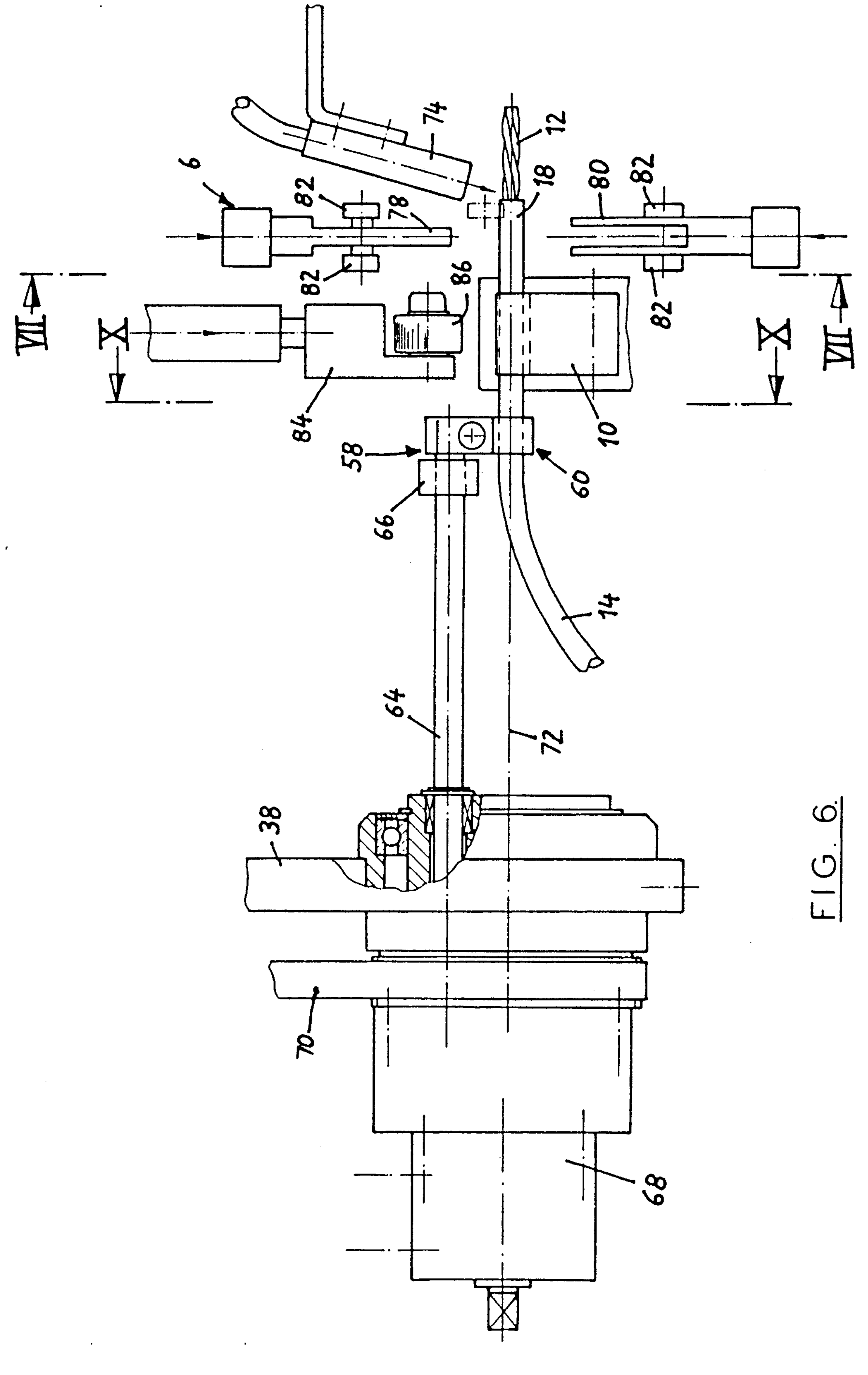
Figure 7:
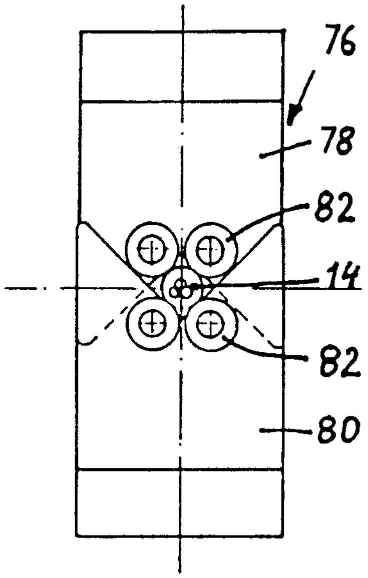
Figure 8:
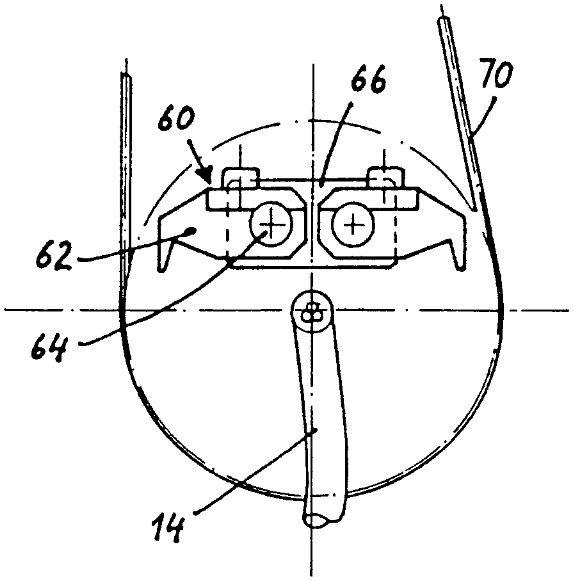
Figure 9:
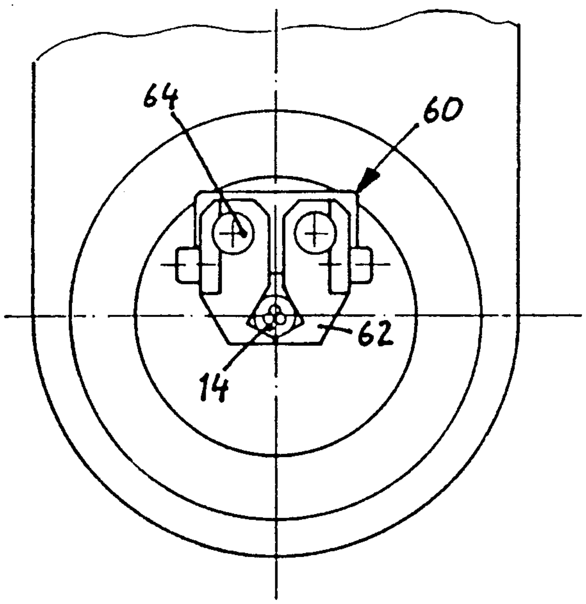
Figure 10:
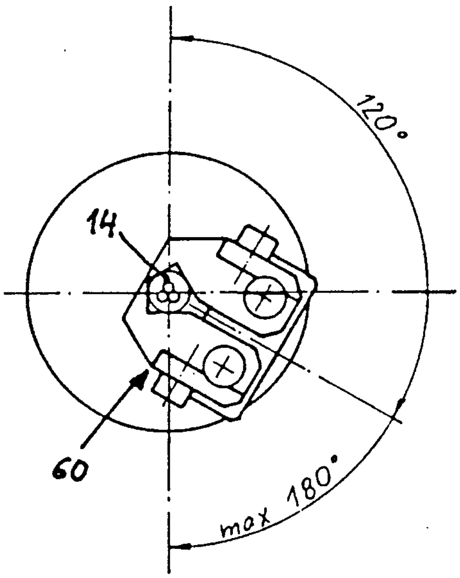

A practical embodiment of the invention is explained below in more detail with the aid of the drawing. The following are shown:

FIG. 1 a simplified plan view onto a measuring station, in which the angle of rotation position of a desheathed cable end is determined by mechanical scanning;

FIG. 2 a side view of the measuring station according to FIG. 1, whereby the scanning element is located in the neutral position;

FIG. 3 a section through a three-core cable in the reference position aspired to during alignment prior to engagement of the three scanning fingers of the scanning element of the device according to FIGS. 1 and 2;

FIG. 4 a cross-section according to section line IV—IV in FIG. 1 through a three-core cable in an angle of rotation position deviating from the reference position with the scanning fingers in contact;

FIG. 5 a cross-section according to section line V—V in FIG. 2, which shows in detail a drive for the turning back of the scanning element to the initial position;

FIG. 6 a side view of an alignment station, in which the previously scanned cable is turned to certain angle of rotation positions in which the colour of the cores is registered;

FIG. 7 a cross-section according to section line VII—VII in FIG. 6 with a centering device activated;

FIGS. 8-10 Cross-sections according to section line X—X in FIG. 6, which show the illustrated tongs-shaped, rotatable retainer of the cable end in various positions.

The measuring station illustrated in FIGS. 1 and 2 and the alignment station shown in FIG. 6 are work-stations arranged in tandem of a cable assembly machine, as are described, for example, in DE-OS 36 43 201. It is assumed in the example that the cables to be assembled are firmly clamped with their ends torsionally firm in tongs, which cables are conveyed step by step from one work-station to the next by a rotating chain. For this purpose, subsequent to the cutting of the cable pieces to length, the cable sheath is first of all removed from the cable ends. Then the exposed cores should be cleansed in a further station of talcum and any contamination which might be able to affect the colour identification, for example, by means of roller brushes. The normally twisted cores may also be already partially or wholly untwisted before the cables are conveyed by the ends to be assembled into the measuring station shown in FIGS. 1 and 2. It is determined there which angle of rotation deviations exist between the incidental angle of rotation position of the cable end clamped firmly in the conveying tongs 10 (see FIG. 6) and a defined angle of rotation position, at which the cores designated by 12 of a cable 14, independent of the differing colour of their insulation, take up a certain position, for example, the position according to FIG. 3 at which in the case of a three-core cable the equilateral triangle circumscribing the cores points upwards with one point. The measuring station according to FIGS. 1 and 2 bears a scanning element 16 with the aid of which it is determined which random arrangement the cores 12 have where they egress from the cable sheath 18. For this purpose the scanning element 16 has several scanning fingers 20, indeed three in the example, in order by this means to engage in the three groove-shaped intermediate spaces between the cores 12 of the three-core cable 14. The points of the scanning fingers 20 are correspondingly small enough so that they fit into the intermediate spaces. Besides this the possibility exists of designing the free ends of the scanning fingers 20 not with protruding points but with central recesses in which one core 12 each nestles when the gripper-shaped scanning element 16 is in contact with the exposed cores 12 simultaneously on several sides.

It is evident that in the case of two-core cables, normally a scanning element with only two opposingly arranged scanning fingers will be utilized. In the case of cables with three and more cores scanning elements with three or more scanning fingers are usable for the sake of expediency. In this conjunction it is, however, to be observed that the number of scanning fingers 20 does not have to correspond with the number of cores 12. It is merely important that the arrangement of the scanning fingers corresponds with the arrangement of cores or core intermediate spaces in the cable around the circumference so that all scanning fingers are able simultaneously to either engage in the intermediate spaces of the cores or to respectively partially encompass a core.

The three scanning fingers 20 comprise angled levers and are mounted in the zone of the apex rotatably on a carrying component 22 with equal distribution around the circumference. The carrying component has a hollow shaft 24, by which means it is mounted rotatably in a bearing block 26. An actuating rod 28 extends through the hollow shaft 24, the front end of which is pressed by means of a pressure spring against the radially outwardly directed legs 21 of the scanning fingers 20. However, the torque exerted in clockwise direction by this means on the scanning fingers 20 is smaller than the opposingly acting torque which tension springs 30 acting on the legs 21 exert on the scanning fingers 20. Hence, the pretensioning by the tension springs 30 leads to the scanning fingers 20 normally having the tendency to make contact with their free ends in compliance with FIG. 1 radially against a cable introduced between them. The radial contact pressure is determined for this purpose by the strength of the tension springs 30 and of the pressure springs acting on the actuating rod 28 and the leverage ratios. The contact pressure can be relatively powerful, for as a consequence of the axial relative movement, yet to be described, between the cable end 14 and the scanning fingers 20, provision is made that the free ends of the scanning fingers 20 provided with points in the example in compliance with FIGS. 3 and 4 also slide into the gusset-shaped external intermediate spaces of the cores 12 when the points have initially set themselves down under powerful contact pressure onto the radially outermost circumferential zone, relative to the centre axis of the cable, of the cores 12.

The actuating rod 28 has to be slid outwards to the front in order to pivot the scanning fingers 20 into the radially outward expanded position, i.e. into the open position of the scanning element. An actuating cylinder 32 firmly connected with the bearing block 26 serves this purpose, and the piston rod 34 of this cylinder is flush with the actuating rod 28 and is pressable up against the latter's rear end. As shown in FIG. 1 the piston rod 34 can also be drawn back so far that an air gap exists between it and the actuating rod 28, whilst the scanning fingers 20 are in contact with the cores 12 of the cable.

The bearing block 26 is axially guided along a straight guidance in the form of two parallel rods 36 relative to the centre axis of the cable end 14, and can be shifted back and forth within a certain axial range in this direction by means of a power cylinder 40 secured by means of a machine frame 38 bearing the guidance bars 36, of which cylinder the connexion rod 42 is connected via a flexible coupling 44 to the bearing block 26.

Furthermore, an angle of rotation signal generator 46 is affixed to this bearing block 26, to which belongs a disc 48 connected torsionally firmly with the hollow shaft 24, which disc is provided on its circumference with a scale-like, for example, magnetically, electrically or optically scannable marking, whereby the pulses generated by the markings on the rotating disc 48 are counted by means of the pertinent evaluation circuit when the carrying component of the scanning fingers 20, on the basis of a certain initial position, for example, in compliance with FIG. 3, turns in the one direction or the other by a certain angle. In this way it can be established by means of the angle of rotation signal generator 46 in which direction and by which angle the carrying component 22 has been turned from a certain initial position.

The initial position or zero position of the rotational movement to be measured of the carrying component 22 is determined by a cam 50 attached torsionally firmly to the hollow shaft 24 (see FIGS. 2 and 5), which cam alone as a consequence of its own weight has the tendency to turn back the carrying component 22 to there after each excursion from the zero position. In addition a restoring device shown in FIGS. 2 and 5 is also provided, which device engages in cam 5 and always guides the latter back into the vertical position suspended downwards. In this position of the cam the carrying component 22 is located in the initial position from where the rotational movements are measured, whereby the scanning fingers 20 take up, for example, the position shown in FIG. 3.

A fork 52 shown in FIG. 5 serves as a restoring device, which fork is guided in vertical direction in a straight line by the connexion rod of a regulation cylinder 56 between guidance pins 54. As shown in FIG. 5, the fork 52 can only be pulled back so far upwards that the cam 50 when turned in any direction knocks each time externally against one of the bottom ends of the fork 52. The rotational movement of the carrying component 22 and the cam 50 is limited thereby to about 120° to 150° in each direction. It is prevented in particular that the fork 52 overlaps the cam 50 whilst it takes up a position deviating from the initial position by 180°. Even when the cam 50 is located in the extreme position shown in FIG. 5 by the line consisting of dots and dashes pointing inclined upwards, the fork 52 travelling downwards due to the regulating cylinder 56 is able to press it back into the initial position. When the fork 52 overlaps the cam 50 in the lowest position with a mutually matching cross-section, the carrying component 22 is locked in the initial position. On the other hand the fork withdrawn into the upper position according to FIG. 5 does not in the slightest hinder the rotational movements of the carrying component 22 within the predetermined limits. This applies equally to the piston rod 34 of the actuating cylinder 32, when this rod is fully withdrawn in compliance with FIG. 1. The aforementioned device described in connexion with FIGS. 1 to 5 functions as follows:

The scanning element 16 is located in the initial position in the position according to FIG. 2. Thereby the actuating cylinder 32 presses by means of its piston rod 34 against the actuating rod 28 so that the scanning fingers 20 are spread apart and a pair of conveying tongs is able to introduce a cable end 14 horizontally between the scanning fingers 20 into a central position in which the centre axis of the cable is flush with the hollow shaft 24. The fork 52 is able in this phase to have already been drawn back by the actuating cylinder 56 upwards into the position shown in FIG. 2, since the weight of cam 50 makes provision that the three scanning fingers 20 initially maintain their respective position on the circumference in compliance with FIG. 3. The possibility remains, however, of leaving the fork 52 initially in its lower final position in which it encompasses the cam 50 and locks the scanning element 16 in its initial position until the actuating cylinder 32 draws back the piston rod 34 so that the scanning fingers 20 are brought by the tension springs 30 into contact with the cores 12 right next to the end of the cable sheath 18. If the fork 52 has not already released the rotational movements of the scanning element 16 at an earlier stage, it must now be drawn back upwards into the position according to FIG. 2 so that the entire scanning element 16 together with its scanning fingers 20 is able to rotate freely, whilst the points of the scanning fingers have the tendency due to the effect of the tension springs 30, to penetrate deeply into the gusset-shaped external intermediate spaces between the cores 12. If it is assumed that the cores 12 have incidentally the position shown in FIG. 4, this does not work without rotation of the scanning element 16, until the scanning fingers 20 have reached the position in compliance with FIG. 4 from the position according to FIG. 3. In the example in compliance with FIGS. 3 and 4 the angle of rotation signal generator 46 would register a rotation of the scanning element 16 and hence a deviation by 30° of the position of the cores from the reference position according to FIG. 3.

Although the entire unit of the scanning element 16 is very easily rotatable, since it is not connected to any drive, it could occur that the points of the scanning fingers 20 land on the radially outermost points of the cores relative to the centre axis of the cable and not in the gusset-shaped external intermediate spaces between the cores 12. However, in this case the envisaged axial back and forth movement of the scanning element 16 by means of the power cylinder 40 is a help. The movement relative to FIG. 1 to the right begins immediately after the piston rod 34 of the actuating cylinder 32 has been drawn back, hence the points of the scanning fingers 20 have touched the cores 12 right next to the end of the cable sheath 18. The shift path of the bearing block 26 together with the scanning element 16 can amount to, for example, 10 to 20 mm. This travel is sufficient to allow due to the twist in the cores 12 the points of the scanning fingers 20 to penetrate with certainty the gusset-shaped external intermediate spaces between the cores. The points of the scanning fingers 20 then remain there in the case of further axial movement of the scanning element 16, until they have reached the end of the axial back and forth movement again in the position shown in FIG. 1 right next to the end of the cable sheath 18. Whilst the points of the scanning fingers 20 have penetrated in circumferential direction into the gusset-shaped external intermediate spaces of the cores 12, and due to their twist have been carried further in circumferential direction during the back and forth movement, the evaluation circuit of the angle of rotation signal generator 46 counts the angular increments of the rotational movement in both directions, starting from the beginning position according to FIG. 3, and registers at the end the angular deviation of the incidental position of the cores according to FIG. 4 from the reference position according to FIG. 3.

Subsequent to the scanning described above of the cores and the measurement of the angular deviation from the reference position right next to the end of the cable sheath 18, the scanning fingers 20 are again spread apart by the actuating cylinder 32 running with its piston rod 34 up against the actuating rod 28. As soon as the points of the scanning fingers 20 have lifted away from the cores 12, the actuating cylinder 56 can run the fork 52 downwards and by this means turn back the cam 50 and the entire scanning element to the initial position according to FIG. 3. The rotational path can be measured thereby also by means of the angle of rotation signal generator 46 and by way of control this measurement be compared with that which was carried out when the scanning fingers 20 were brought into excursion in circumferential direction by the cores 12. The angle measured in the measuring station according to FIGS. 1 and 2 is communicated to the control device of the alignment station described as follows in compliance with FIG. 6.

The same pair of conveying tongs 10, which held a certain cable end 14 during the scanning in the measuring station according to FIGS. 1 and 2 bears this cable end with unchanged clamping power, hence also With an unchanged angle of rotation position, into the alignment station according to FIG. 6. Located there is a rotatable retainer 58 with a pair of tongs 60 shown in FIGS. 8 to 10. The tongs' arms designated by 62 are seated respectively torsionally firmly on the end of a rotationally drivable shaft 64. The two shafts 64 are guided in a steady rest 66 near to their outer ends.

The rotational drive of the two shafts 64 is effected by a pneumatic rotating unit 68 which is rotatably mounted on the machine frame 38 and is rotatable by means of a non-illustrated motor via a drive belt 70 together with the shafts 64 and the tongs 60 about an axis 72, which axis is flush with the centre axis of the cable end 14, after this has been conveyed by the conveying tongs 10 into the alignment station. The rotational axis 72 is simultaneously the centre axis of the tongs' jaws of the tongs 60 in closed state. In open state in compliance with FIG. 8 the arms 62 of the tongs are swivelled up by approx. 90°, so that the cable end 14 is conveyable by means of the conveying tongs 10 in a horizontal movement into the central position in the alignment station.

As is evident from FIG. 6, the conveying tongs 10 hold the cable ends 14 at a certain distance from the end of the cable sheath 18. This distance is a result necessitated by machining processes. On the other hand a certain mobility and positional imprecision of the free end of the cable in the zone where a colour sensor designated by 74 in FIG. 6 directs its ray onto one of the relatively thin cores 12 arise therefrom. In order to exclude the imprecision mentioned there is provided a centering device 76 which in the activated state as illustrated in FIG. 7, acts right at the end of the cable sheath 18 and centres there the cable relatively to the rotational axis 72 of the rotatable retainer 58 but allows in the centred state the rotation of the cable 14 about the axis 72.

The centering device 76 consists of an upper centering jaw 78 and a lower centering jaw 80, which are each provided with a central V-shaped recess which lead the cable 14 to the axis 72 upon closing the centering jaws 78 and 80 from the open position according to FIG. 6 to the closed position according to FIG. 7. As follows from FIG. 6 the lower centering jaw 80 is designed fork-shaped in side view, so that the upper centering jaw 78 is able to penetrate between the legs of the fork upon closing. Two rollers 82 are mounted on each centering jaw 78, 80, on each side. The four outer rollers 82 set down right at the end of the cable sheath 18 upon the same when the centering jaws 78, 80 close, as indicated in FIG. 6 by a line consisting of dots and dashes. It follows from FIG. 7 that the rollers 82 each protrude next to the apex of the V-shaped recesses above the latters' surfaces, so that when the centering jaws 78, 80 are closed the cable is rotatably guided twice between four rollers 82.

A centering device corresponding with the centering device 76 can also be provided at the measuring station according to FIGS. 1 and 2, in order to centre the cable during scanning by means of the scanning fingers 20 right at the end of the cable sheath. However, in doing this the rollers 82 are preferably absent, so that the cable end is held better against turning.

The conveying tongs 10 must be openable and closable in the alignment station according to FIG. 6, so that the cable ends can be turned from the incidental angle of rotation position with which they are conveyed to this point to the desired aligned position and can then be firmly clamped in the latter position by the conveying tongs 10. In the example the conveying tongs 10 well-known from DE-OS 36 43 201 are used, which tongs are each held by spring power in the clamping position and are openable by means of a ram 84 with a roller 86 at the free end, which roller is pressable at the clamping tongs up against a lever.

The alignment station described above functions as follows:

Whilst a pair of conveying tongs 10 advances a cable end 14 moving horizontally, the tongs 60 of the rotatable retainer 58 takes up the wide open position shown in FIG. 8, which position allows that the cable end is brought flush with the rotating axis 72. The centering device 76 is also located at the beginning in the open position in accordance with FIG. 6. The ram 84 for the purpose of opening the conveying tongs 10 in the alignment station is drawn back upwards to its inactive position.

As soon as the clamping tongs 10 has stopped in the alignment station and the free end of cable 14 is located essentially flush with the rotating axis, whilst the two drive shafts 64 take up their uppermost position in compliance with FIG. 8, the tongs 60 of the rotatable retainer 58 closes on the left side relative to FIG. 6 of the conveying tongs 10, so that the position according to FIG. 9 results. Simultaneously the centering device 76 also closes, so that the cable at the end of the cable sheath according to FIG. 7 is centred by the rollers 82. The ram 84 is then run downwards and the conveying tongs 10 opened by this means due to the sequence control system which controls the movements of the parts described in the alignment station. The rotatable retainer 58, consisting of the tongs 60, their two drive shafts 64 and their pneumatic rotation unit 68, is now turned, driven by the belt 70, relative to the rotation axis 72 by that angle which had been measured previously in the measuring station according to FIGS. 1 and 2 as the angular deviation from the reference position of the core arrangement. By this means the cores of the cable 14 are turned from their incidental initial position, for example, in compliance with FIG. 4, to the desired predetermined position, for example, according to FIG. 3. This rotational movement can take place very quickly since the angle by which it is to be turned, is known by the aforegoing measurement and the cable is held reliably torsionally firmly by the tongs 60 and is centred precisely by the centering device 76.

After the cable has been turned to the first predetermined angle of turn position by rotating to the right or left, in which position the cores 12, independent of their colour, take up, for example, the position shown in FIG. 3, a ray of light is directed onto the uppermost core 12 by the colour sensor 74, which in the practical embodiment by way of the example unites transmitter and receiver, in accordance with the arrow 88 entered in FIG. 3, and reflects back partially from this core to the colour sensor 74. The colour sensor is thus able to determine whether a core of a certain colour, for example, a core with blue insulation, as foreseen for further cable assembly, is located in the uppermost position. Should this be the case at the first attempt, the conveying tongs 10 will be closed by withdrawing the ram 84 upwards, whilst the tongs 60 and the centering device 76 re-open, and then the cable can be conveyed further to the cable assembly machine's next processing station.

In many cases the first colour identification process results in that the colour determined for the core envisaged for the uppermost position, is not yet located there but in one of the two lower core positions. The colour sensor 74 then determines in the uppermost position one of the other two occurring core colours. When it is clearly established in which sequence the various coloured cores are arranged around the centre of the cable in a particular circumferential direction, it can be concluded from the colour identified in the uppermost core position, whether, for example, the sought after blue core relative to FIG. 3 is located right or left at the bottom. A single further turn by 120° to the right or left is then sufficient subsequent to the first colour identification process to bring the blue core into the predetermined uppermost position. This turn through a very particular angle can also be very quickly and precisely executed by the belt drive 70. This is then followed again by the clamping of the aligned cable end in the conveying tongs 10 and the onward conveyance to the next work-station.

In contrast, if the sequence of differently coloured cores is not clearly established in a certain circumferential direction about the centre of the cable, where necessary a second colour identification process and thereupon once again a rotational movement of the cable have to be carried out, in order to achieve the desired aligned angle of rotation position of the cable at which it is again clamped by the conveying tongs 10 and is conveyed onward to the next work-station. In the case of all of the rotational movements quoted the cable and hence the rotatable retainer 58 need not be turned by more than 180° in either of the two directions of rotation, as indicated in FIG. 10. A maximum of 60° are necessary in the case of a three-core cable in order to turn the cable from a random, incidental initial position to a first predetermined angle of rotation position according to FIG. 3. A second core is brought before the colour sensor 74 by means of a further rotation through 120° in the same direction of rotation. If it turns out after the complete rotation path of 180° for the subsequent colour identification that the second core irradiated by the colour sensor does not yet have the colour sought, as a final rotational movement this core is turned in the opposite direction by 240° for the purpose of aligning the cable.

Colour identification by means of colour sensor 74 is disturbable by external influences, for example, talcum adhering to the cores, or positional tolerances of the cores within the cable sheath 18, which lead to the colour sensor receiving reflected light not only from one single core. In order to exclude errors of the latter mentioned type, in some cases it has proven to be advantageous to not direct the light ray of the colour sensor 74 radially onto the centre of the cable, as shown in FIG. 3, but to select a tangential ray direction relative to the cable's longitudinal centre axis, and to make provision by means of a relative rotational movement between cable and colour sensor that the cores migrate during this rotational movement into the ray which is directed initially tangentially past them. Considerable certainty then exists that in the phase in which the colour sensor receives the first light reflected by a core, no light is yet reflected by another core.

The last described colour identification process can be executed with a tangentially aligned, stationary colour sensor and rotation of the cable about its axis. Alternatively, the possibility exists during the colour identification process of holding the cable torsionally firmly, whilst the colour sensor 74 executes a pivoting movement about a centre of rotation outside of the cable in an angular zone which is essentially determined by two tangential directions of rays relative to the cable. In so doing the centre of rotation of the colour sensor will lie for the sake of expediency on a radially extending centre line or bisector between two cores relative to the cable axis, so that the colour sensor takes up in its central position one of those positions in which the scanning fingers 20 are shown in FIG. 3. When the colour sensor 74 is pivoted from one of its extreme inclined positions, in which the ray of light is essentially directed tangentially to the cable, to the centre position in which the ray of light is directed onto the cable axis, first of all, with certainty, only a single core will enter into the ray of light, of which core the colour can be unambiguously determined without the colour identification process being disturbed by light reflected from another core. During the further progression of the pivoting movement of the colour sensor 74 from its central position to the other extreme inclined position a clear colour identification is also possible in the phase where the light ray of the colour sensor already partially passes by the cores and only a part of the ray of light is reflected by a single core to the colour sensor. In this way with a single pivoting movement of the colour sensor 74 the colours of two cores can be identified, for at the beginning of a pivoting movement from one extreme inclined position a first core enters into the ray of light, and at the end of this pivoting movement a second core egresses from the ray of light. Only the light received at the beginning and end of this pivoting movement is evaluated for colour identification.

It is self-evident that the individual devices described above of the measuring station according to FIGS. 1 and 2 and of the alignment station according to FIG. 6 can be multifariously modified whilst upholding their described functions. Thus the possibility exists, for example, of scanning the cable ends respectively right next to the end of the cable sheath 18 using one or several sensors, which are led around the cable and in so doing register the cores 12 and their gusset-shaped external intermediate spaces. To date mechanical scanning processes do indeed seem to be the most precise, in order to determine as precisely as possible the angular deviation of the incidental angle of rotation position of the cable from a first defined angle of rotation position. However, the possibility exists fundamentally of scanning the incidental position of the cores, for example, using a ray of light or ultrasonics, and where necessary to determine it by evaluation of a picture taken by a video camera. If sufficient accuracy, as is the case with mechanical scanning processes, is achievable by this means, an equal effect exists by all means in the terms of the invention, because in the case of the latter it is decisively a question of the incidental position of the cores being determined initially when the cable end is held torsionally firmly by mechanical or other scanning with equal effect, and the angular deviation is measured from an initially determined angle of rotation position and thereupon the colour identification is carried out in an alignment station arranged next to the measuring station, after the cable end has been turned by a controllable rotational drive by the angular deviation measured.

What is claimed is:

1. Device for the alignment of desheathed ends of cables with several cores, comprising a measuring station in which a desheathed cable end is firmly held in an initial angular position against rotation during a scanning operation, a scanning element in the measuring station which differentiates between the cores of the desheathed cable end and spaces therebetween, wherein the scanning element contacts the cores and is rotatable about the longitudinal axis of the cable end, an angle of rotation measuring device coupled with the scanning element, an aligning station comprising a color sensor, means for conveying the cable end between the measuring and aligning stations, and a rotatable retainer for rotating the cable end by certain angles, wherein the measuring device measures the angle of rotation necessary to rotate the cable end from the initial angular position to a desired first angular position, in which the cores have a certain position independent of their color, and wherein the rotatable retainer rotates the cable end in accordance with the measured angle.

2. Device according to claim 1, wherein the scanning element (16) is simultaneously placed at various positions upon the circumference of the desheathed cable end (14) by means of several scanning fingers (20).

3. Device according to claim 2, wherein the scanning fingers (20) are guided on a common, rotatably mounted carrying component (22) and are pressable up against the cores (12) by spring force (30).

4. Device according to claim 3, wherein the scanning fingers (20) are withdrawable by means of a common actuating element (28) from the cores (12) against the spring force (30), the drive (32) of which actuating element is disconnectable in the case where the scanning fingers (20) are in contact with the cores (12).

5. Device according to claim 7, wherein a bearing (26) surrounding the carrying component (22) is axially slidable relative to the cable end (14), so that the scanning fingers (20) are slidable a certain distance along the cores (12), essentially until up against the end of the cable sheath (18).

6. Device according to claim 3, wherein a rotational drive (52, 56) of the carrying component (22), by which means the latter is turnable back to a certain initial position, is detachable from the carrying component (22) during the scanning of the cores (12).

7. Device according to claim 6, wherein the rotational drive consists of a fork (52) which is slidable radially with respect to the rotational axis of the carrying component (22), which fork cooperates with a cam (50) attached firmly to the carrying component (22).

8. Device according to claim 3, wherein a number of scanning fingers (20) corresponding with the number of cores (12), in the form of levers, are mounted rotatably on the carrying component (22) and are pivotable by means of an actuating rod (28) which is axially slidable by means of a drive bar (34) which bar is withdrawable from the end of the actuating rod.

9. Device according to claim 1, wherein the means for conveying the cable end between the measuring station and the aligning station comprises movable clamping tongs (10) which firmly hold the cable (14) near the free end of the cable sheath (18), wherein the aligning station comprises a centering device (76) in which the cable end (14) is rotatable, placed in contact with the cable sheath directly adjacent to the free end of the cable sheath (18), and wherein on a side of the clamping tongs (10) opposite to the centering device, the rotatable retainer (58) is firmly clampable onto the cable sheath (18).

10. Device according to claim 9, wherein the rotatable retainer (58) comprises a pair of tongs (60) each of said tongs being pivotable upwards by at least about 90° and comprising a jaw, further wherein the tongs are as a whole rotatable about an axis centered between the jaws.

11. Device according to claim 9, wherein the centering device (76) comprises at least two V-shaped centering jaws (78, 80) with a total of at least three centering rollers (82) mounted on them.

12. Device according to claim 1, wherein a single colour sensor (74) is firmly arranged and a light ray therefrom is essentially directed tangentially relative to a circle circumscribing the cores (12).

13. Device according to claim 1, wherein a single colour sensor (74) is mounted pivotably and is guided in such a way that a light ray therefrom forms at least once a tangent to the circle circumscribing the cores (12) during a back and forth pivoting movement.

* * * * *

UNITED STATES PATENT AND TRADEMARK OFFICE
CERTIFICATE OF CORRECTION

PATENT NO. : 5,040,940

DATED : August 20, 1991

INVENTOR(S) : Helmut Kolodziej et al

It is certified that error appears in the above-identified patent and that said Letters Patent is hereby corrected as shown below:

ON THE TITLE PAGE

In the Abstract

Line 10 "scaning" should be -- scanning --

In the Claims

Claim 5, line 1, "7" should be -- 3 --

Signed and Sealed this

Eighth Day of June, 1993

Attest:

Michael K. Kirk

MICHAEL K. KIRK

Attesting Officer

*Acting Commissioner of Patents and Trademarks*